United States Patent
Chou

(10) Patent No.: US 7,406,745 B2
(45) Date of Patent: Aug. 5, 2008

(54) WHEEL ASSEMBLY

(75) Inventor: Chuan-Hai Chou, Sanchong (TW)

(73) Assignee: Haion Caster Industrial Co., Ltd., Taipei County (TW)

( * ) Notice: Subject to any disclaimer, the term of this patent is extended or adjusted under 35 U.S.C. 154(b) by 103 days.

(21) Appl. No.: 11/584,015

(22) Filed: Oct. 20, 2006

(65) Prior Publication Data

US 2008/0092329 A1    Apr. 24, 2008

(51) Int. Cl.
*B60B 330/00* (2006.01)
(52) U.S. Cl. .................... 16/35 R; 188/1.12; 280/79.11
(58) Field of Classification Search ................. 16/35 R; 188/1.12; 280/79.11
See application file for complete search history.

(56) References Cited

U.S. PATENT DOCUMENTS

| | | | | |
|---|---|---|---|---|
| 5,133,106 A | * | 7/1992 | Milbredt et al. | 16/35 R |
| 5,503,416 A | * | 4/1996 | Aoki et al. | 280/79.11 |
| 5,774,936 A | * | 7/1998 | Vetter | 16/35 R |
| 5,899,469 A | * | 5/1999 | Pinto et al. | 280/79.11 |
| 5,988,323 A | * | 11/1999 | Chu | 188/1.12 |
| 6,321,878 B1 | * | 11/2001 | Mobley et al. | 188/1.12 |
| 6,336,524 B1 | * | 1/2002 | Van Loon et al. | 188/1.12 |
| 6,584,641 B1 | * | 7/2003 | Milbredt | 16/35 R |
| 6,662,404 B1 | * | 12/2003 | Stroh et al. | 16/35 R |
| 6,668,965 B2 | * | 12/2003 | Strong | 180/411 |
| 6,834,746 B1 | * | 12/2004 | Lin | 188/1.12 |
| 6,865,775 B2 | * | 3/2005 | Ganance | 16/35 R |
| 7,134,167 B2 | * | 11/2006 | Yan | 16/39 |

* cited by examiner

*Primary Examiner*—J. Allen Shriver
*Assistant Examiner*—Matthew J Sullivan
(74) *Attorney, Agent, or Firm*—Troxell Law Office, PLLC

(57) ABSTRACT

A wheel assembly has a swiveling shaft, a support member movably assembled with the swiveling shaft, an arresting member and wheels. The swiveling shaft includes a swiveling sleeve, a pressing element disposed on the swiveling sleeve, and a first gear bracket and a second gear bracket. The support member includes a rack with an opening, and a third gear bracket snapped in the opening, The arresting member is mounted on the rack. A first resilient element is provided between the arresting member and the rack. A second resilient element is provided between the arresting member and the third gear bracket. The wheels respectively pivot to the rack, and are limited at opposite sides of the arresting member. The pressing element limits rotation of the wheels, preventing deformation of the wheels thereby effectively stopping the wheels and lengthening lives of the wheels.

11 Claims, 5 Drawing Sheets

WHEEL ASSEMBLY

BACKGROUND OF THE INVENTION (a) Field of the Invention

The present invention relates to a wheel assembly, and particularly to a wheel assembly which prevents from deformation and stops effectively.

(b) Description of the Prior Art

A conventional truckle wheel assembly substantially comprises a base and wheels pivoting to the base. An arresting member is disposed between the base and the wheels. The arresting member is a metal plate attached to the wheel. A shaft is provided on an end of the base for assembling the wheels to a bottom of an object. The wheels rotate to move the object, and at the same time, cooperate with the shaft to bring the base to rotate the wheels in multi-directions. As the object arrives at a predetermined position, the arresting member presses the wheels to stop.

However, the truckle wheel assembly is normally made of material like plastic, rubber etc. The wheels are pressed by the arresting member repeatedly, and evenly, are pushed/pulled forcedly with constraint of the arresting member from time to time. Consequently, the wheels are easy to scrape or deform, resulting in failure to rotate and thus being useless.

SUMMARY OF THE INVENTION

To obviate the above drawback, accordingly, an object of the present invention is to provide a wheel assembly which prevents from deformation and is trigged up effectively and which has prolonged lives.

To achieve the above object, the wheel assembly of the present invention comprises a swiveling shaft, a support member movably assembled with the swiveling shaft, an arresting member and wheels. The swiveling shaft includes a swiveling sleeve, a pressing element disposed on the swiveling sleeve, and a first gear bracket and a second gear bracket located on an end of the pressing element. The support member includes a rack with an opening, and a third gear bracket snapped in the opening. protuberances extend inwardly from opposing side walls of the opening. The arresting member is mounted on the rack, and has an end thereof corresponding to the pressing element and the third gear bracket. A first resilient element is provided between the arresting member and the rack. A second resilient element is provided between the arresting member and the third gear bracket. The wheels respectively pivot to the rack and are limited at opposite sides of the arresting member. Each wheel defines an annular groove in a surface thereof for corresponding to the arresting member.

DETAILED DESCRIPTION OF THE PREFERRED EMBODIMENTS

Figure 1:
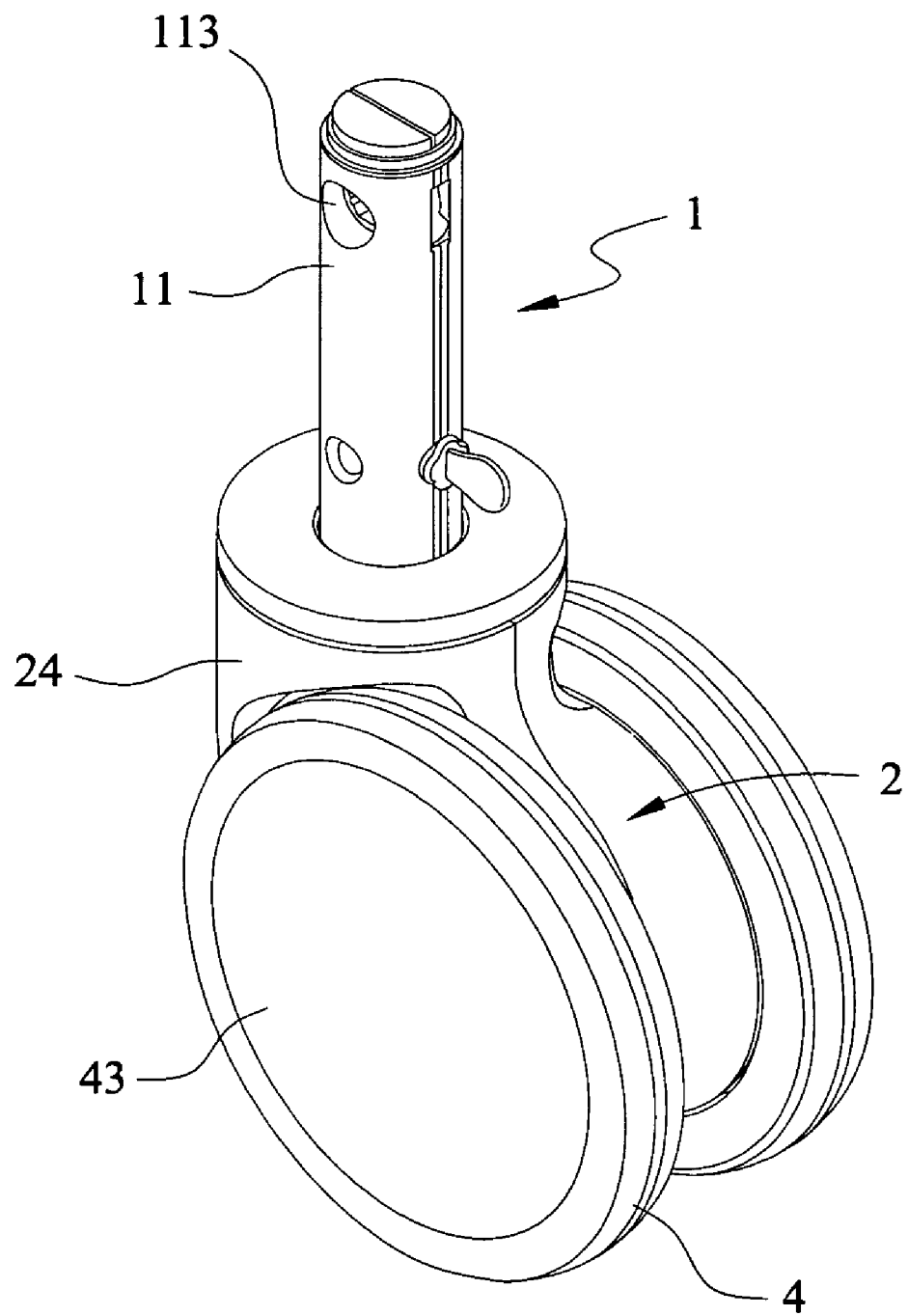
FIG. 1 is a perspective view of a wheel assembly according to the present invention.
Figure 2:
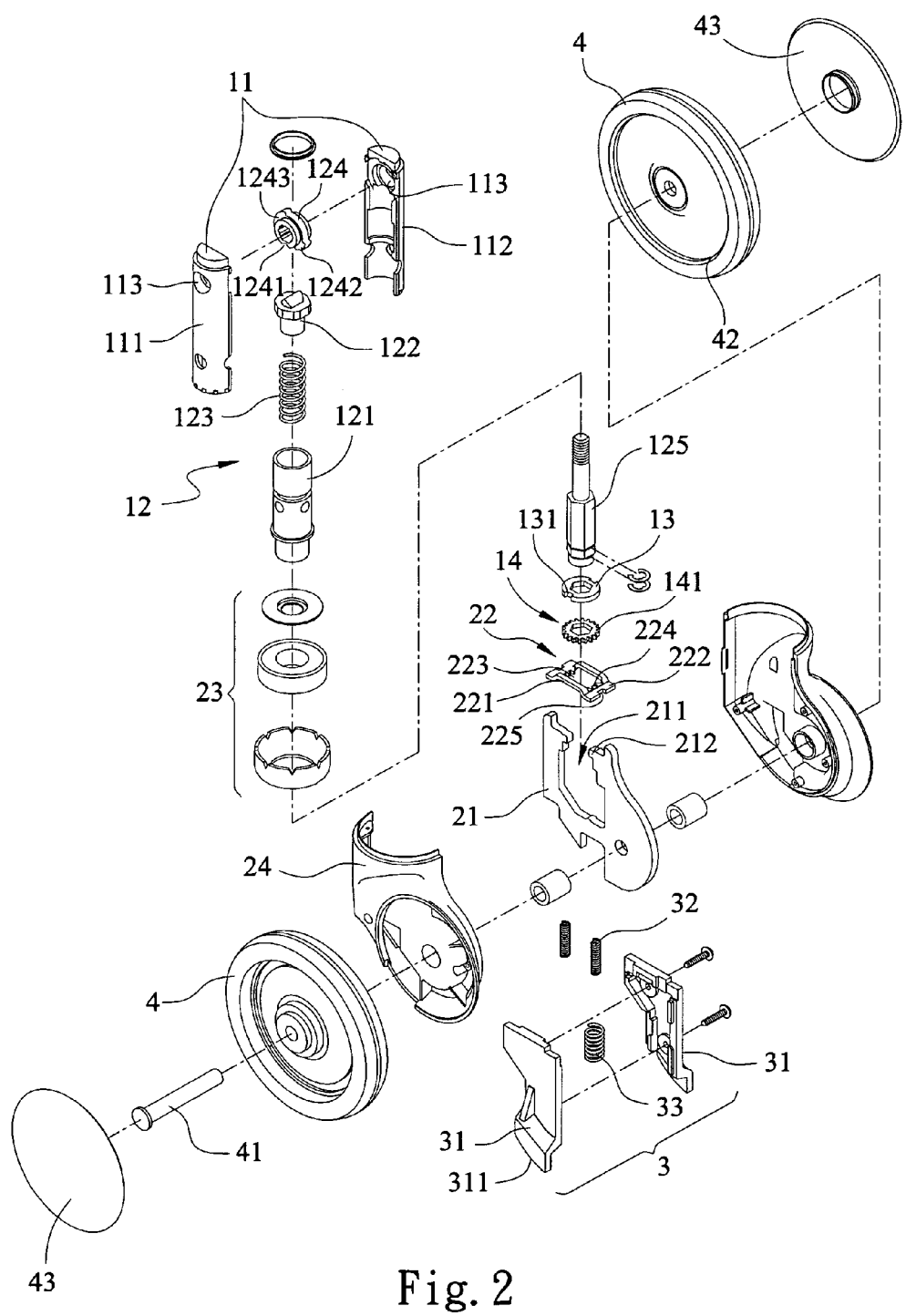
FIG. 2 is an exploded view of the wheel assembly of FIG. 1.
Figure 3:
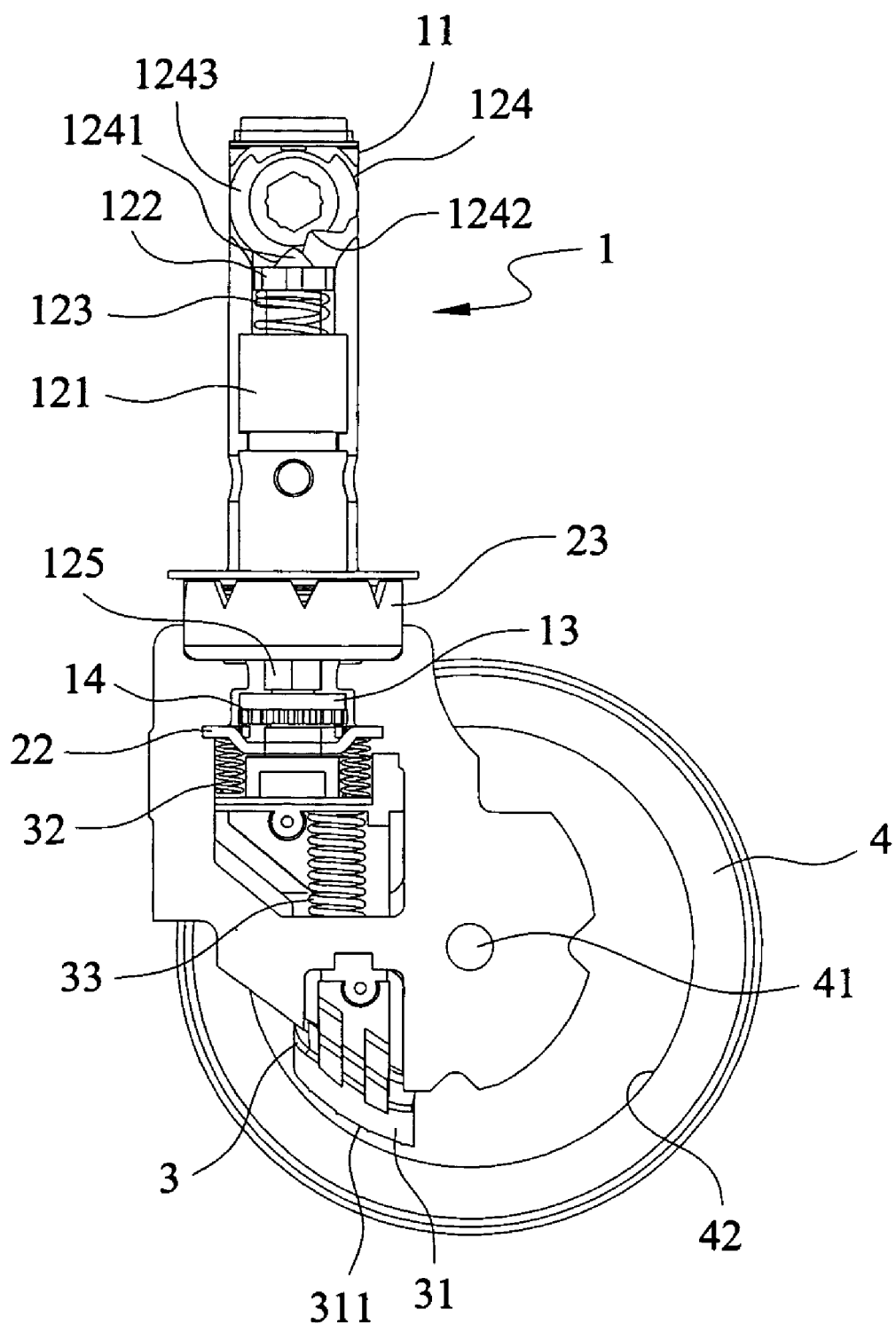
FIG. 3 is a cross-sectional view of the wheel assembly as rotating.

With reference to FIGS. 1, 2 and 3, a wheel assembly in accordance with the present invention comprises a swiveling shaft 1, a support member 2, an arresting member 3 and wheels 4. The swiveling shaft 1 at least comprises a swiveling sleeve 11, a pressing element 12 disposed on the swiveling sleeve 11, and a first gear bracket 13 and a second gear bracket 14 located on an end of the pressing element 12. The swiveling sleeve 11 has a first casing 111 and a second casing 112. Through holes 113 are respectively defined in the first casing 111 and the second casing 112 and correspond to each other for allowing a rotating level (not shown) to extend therethrough and actuate the pressing element 12. The pressing element 12 comprises an axle sleeve 121, a pushing portion 122 partly extending into the axle sleeve 121, a resilient portion 123, a rotating portion 124 and an axle pole 125. The rotating portion 124 abuts an end of the pushing portion 122 and corresponds to the through holes 113. The axle pole 125 is disposed in the swiveling sleeve 11 and abuts another end of the pushing portion 122. The resilient portion 123 is provided between the pushing portion 122 and the axle pole 125. A first recess 1241, a second recess 1242 and a projection 1243 are respectively formed at an outward rim of the rotating portion 124 for cooperating with the pushing portion 122. The first gear bracket 13 and the second gear bracket 14 are arranged at an end of the axle pole 125. Slits 131 are defined in an outward rim of the first gear bracket 13 and correspond to each other. Indented portions 141 are distributed on an outward rim of the second gear bracket 14.

The support member 2 is movably assembled with the swiveling shaft 1, and at least comprises a rack 21 with an opening 211, and a third gear bracket 22 snapped in the opening 211. A bearing 23 is provided at an end of the rack 21 for movably connecting with the axle sleeve 121 of the swiveling shaft 1. Protuberances 212 extend inwardly from opposing side walls of the opening 211. The third gear bracket 22 includes a transverse plate 221 and extension plates 222 respectively on opposite sides of the transverse plate 221. A slot 223 is defined in the transverse plate 221, and tooth-like portions 224 are formed on inner rims of the transverse plate 221. Locking cutouts 225 are respectively defined in the extension plates 222 for locking with the sides walls of the opening 211. The extension plates 222 are slightly higher than the transverse plate 221, defining an offset between the extension plates 222 and the transverse plate 221. A cover 24 is provided outside the support member 2 for covering components inside the support member 2.

The arresting member 3 is mounted on the rack 21, and at least comprises a pair of arresting blocks 31. Each arresting block 31 forms an arcuate interferential portion 311 on an end thereof. A first resilient element 33 is provided between the arresting member 3 and the rack 21. An end of the arresting member 3 corresponds to the axle pole 125 of the pressing element 12 and the third gear bracket 22. A second resilient element 32 is provided between the arresting member 3 and the third gear bracket 22.

The wheels 4 has central shafts 41 respectively for pivoting the wheels 4 on the rack 21 and limiting the wheels 4 respectively at opposite sides of the arresting member 3. Each wheel 4 defines an annular groove 42 in a surface thereof respectively for corresponding to the arcuate interferential portion 311 of the arresting block 31.

Referring to FIG. 3, in use, the swiveling shaft 1 is mounted on a bottom of an object (not shown). The first recess 1241 of the rotating portion 124 engages with the pushing portion 122. The resilient portion 123 between the pushing portion 122 and the axle pole 125 is slightly compressed. The first gear bracket 13 and the second gear bracket 14 of the pressing element 12 keep away from the protuberances 212 and the third gear bracket 22. The axle pole 125 of the pressing element 12 is apart from the arresting member 3. Therefore, the swiveling shaft 1, the support member 2 and the wheels 4 are all free, allowing the wheels 4 to rotate and swivel freely, namely the wheels 4 are allowed to rotate and move in multi-direction.

Figure 4:
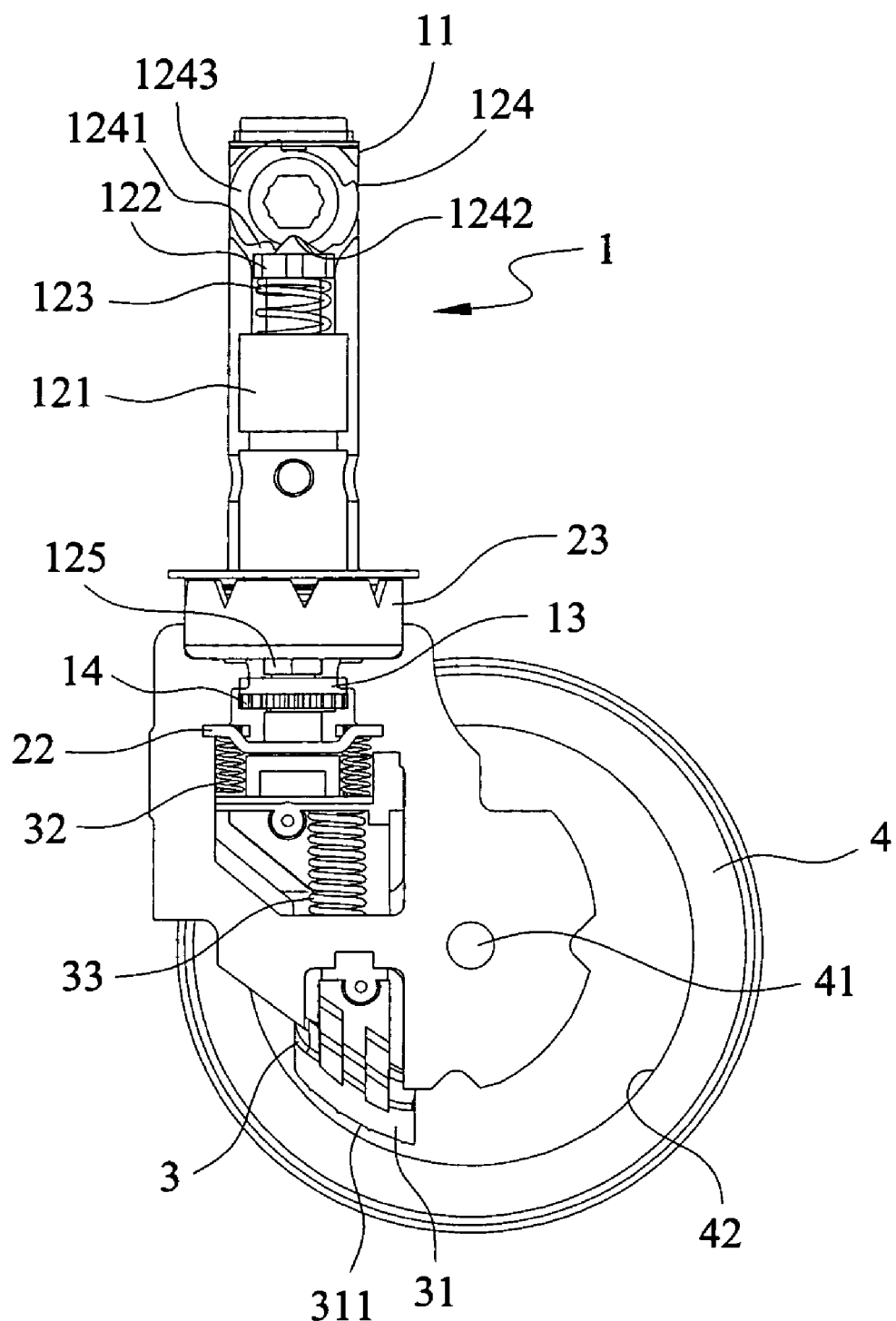
FIG. 4 is a cross-sectional view of the wheel assembly as limiting rotation direction.

Referring to FIG. 4, in order to limit rotation of the support member 2, the rotating level (not shown) is extended into the rotating portion 124, and rotates (clockwise or counterclockwise depending on practical state). The second recess 1242 of the rotating portion 124 abuts against the pushing portion 122. The resilient portion 123 between the pushing portion 122 and the axle pole 125 is released, driving the axle pole 125 to move. The first gear bracket 13 at an end of the axle pole 125 moves upwardly. The slits 131 of the first gear bracket 13 anchor the protuberances 212 of the rack 21. Thus, the first gear bracket 13 limits rotation of the rack 21, correspondingly, limiting rotation of wheels 4.

Figure 5:
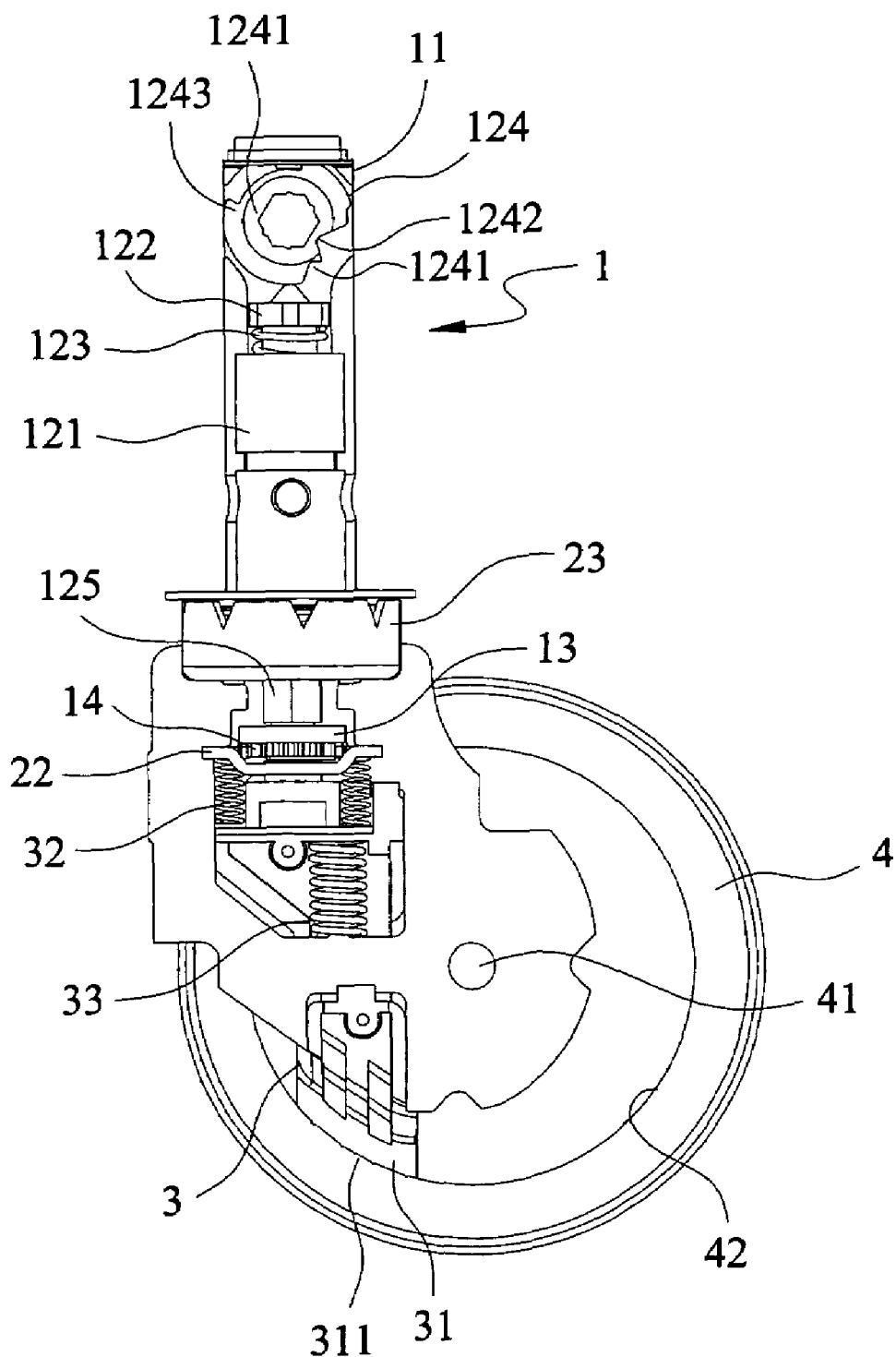
FIG. 5 is a cross-sectional view of the wheel assembly as limiting rotation direction and movement.

Referring to FIG. 5, in order to limit rotation of the support member 2 and the wheels 4 simultaneously, the rotating level is extended into the rotating portion 124 and rotates (clockwise or counterclockwise depending on practical state). The projection 1243 of the rotating portion 124 abuts against the pushing portion 122. The resilient portion 123 between the pushing portion 122 and the axle pole 125 is generally compressed. The pushing portion 122 pushes the axle pole 125, urging the second gear bracket 14 at an end of the axle pole 125 to move downwardly. The indented portions 141 of the second gear bracket 14 mesh the tooth-like portions 224 of the third gear bracket 22. The second resilient element 32 between the arresting member 3 and the third gear bracket 22 is compressed. The second gear bracket 14 restrains rotation of the rack 21, thereby limiting rotation of wheels 4. Meantime the axle pole 125 moves downwardly, pushing the arresting member 3 to move downwardly. The first resilient element 33 between the arresting member 3 and the rack 21 is compressed. The arcuate interferential portions 311 of the arresting member 3 press against the annular grooves 42 of the wheels 4. Thus, the arresting member 3 limits rotation direction and rotation of the wheels 4 simultaneously.

The rotating level is extended into the rotating portion 124 and rotates in a reverse direction so as to set the wheels 4 free. The first recess 1241 of the rotating portion 124 abuts against the pushing portion 122. The resilient portion 123 between the pushing portion 122 and the axle pole 125 is slightly compressed, while the first resilient element 33 and the second resilient element 32 are free. In this state, the wheels 4 swivel and rotate freely.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A wheel assembly comprising:
a swiveling shaft at least including a swiveling sleeve, a pressing element disposed on the swiveling sleeve, and a first gear bracket and a second gear bracket located on an end of the pressing element;
a support member movably assembled with the swiveling shaft, and at least including a rack with an opening, and a third gear bracket snapped in the opening, protuberances extending inwardly from opposing side walls of the opening;
an arresting member mounted on the rack, a first resilient element being provided between the arresting member and the rack, an end of the arresting member corresponding to the pressing element and the third gear bracket, a second resilient element being provided between the arresting member and the third gear bracket; and
wheels respectively pivoting to the rack and being limited at opposite sides of the arresting member, each wheel defining an annular groove in a surface thereof for corresponding to the arresting member.

2. The wheel assembly as claimed in claim 1, wherein the swiveling sleeve has a first casing and a second casing, through holes being formed respectively defined in the first casing and the second casing and correspond to each other for allowing a rotating level to extend therethrough and actuate the pressing element.

3. The wheel assembly as claimed in claim 1, wherein the pressing element comprises an axle sleeve, a pushing portion partly extending into the axle sleeve, a rotating portion abutting an end of the pushing portion, an axle pole disposed in the swiveling sleeve and abutting another end of the pushing portion, and a resilient portion between the pushing portion and the axle pole.

4. The wheel assembly as claimed in claim 3, wherein a first recess, a second recess and a projection are respectively formed at an outward rim of the rotating portion for cooperating with the pushing portion.

5. The wheel assembly as claimed in claim 3, wherein slits are defined in an outward rim of the first gear bracket.

6. The wheel assembly as claimed in claim 3, wherein indented portions are distributed on an outward rim of the second gear bracket.

7. The wheel assembly as claimed in claim 1, wherein a bearing is provided at an end of the rack for movably connecting with the swiveling shaft.

8. The wheel assembly as claimed in claim 1, wherein the third gear bracket includes a transverse plate and extension plates respectively on opposite sides of the transverse plate, a slot being defined in the transverse plate, tooth-like portions being formed on inner rims of the transverse plate, locking cutouts being respectively defined in the extension plates for locking with the sides walls of the opening.

9. The wheel assembly as claimed in claim 8, wherein the extension plates are slightly higher than the transverse plate, defining an offset between the extension plates and the transverse plate.

10. The wheel assembly as claimed in claim 1, wherein the arresting member at least comprises a pair of arresting blocks, each arresting block forming an arcuate interferential portion on an end thereof for corresponding to the annular grooves of the wheels.

11. The wheel assembly as claimed in claim 1, wherein central shafts are provided on the wheels respectively for pivoting the wheels to the rack.

* * * * *